H. N. OTT.
SLIDE POSITIONING AND CHANGING MECHANISM FOR STEREOPTICONS AND THE LIKE.
APPLICATION FILED MAR. 1, 1912.
1,099,310.
Patented June 9, 1914.
3 SHEETS—SHEET 1.
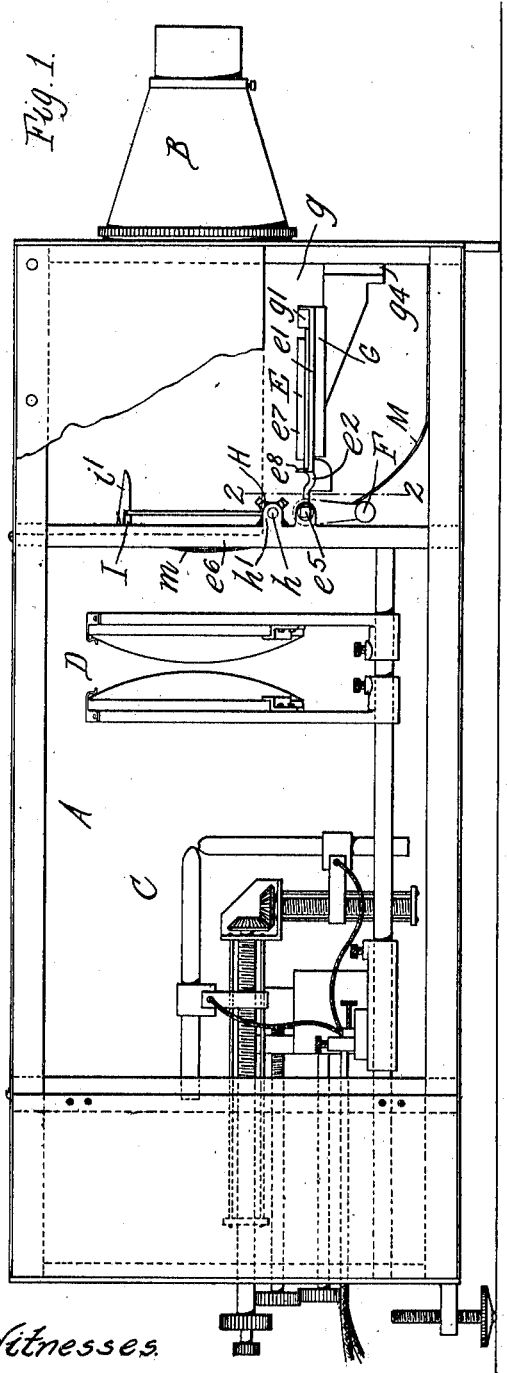
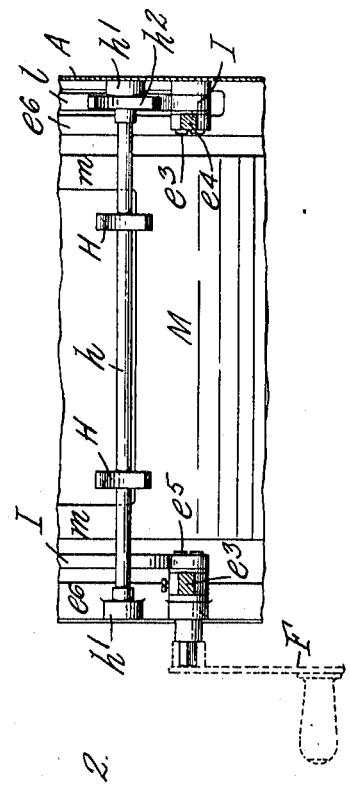
Witnesses.
Inventor.

H. N. OTT.
SLIDE POSITIONING AND CHANGING MECHANISM FOR STEREOPTICONS AND THE LIKE.
APPLICATION FILED MAR. 1, 1912.
1,099,310.
Patented June 9, 1914.
3 SHEETS—SHEET 2.
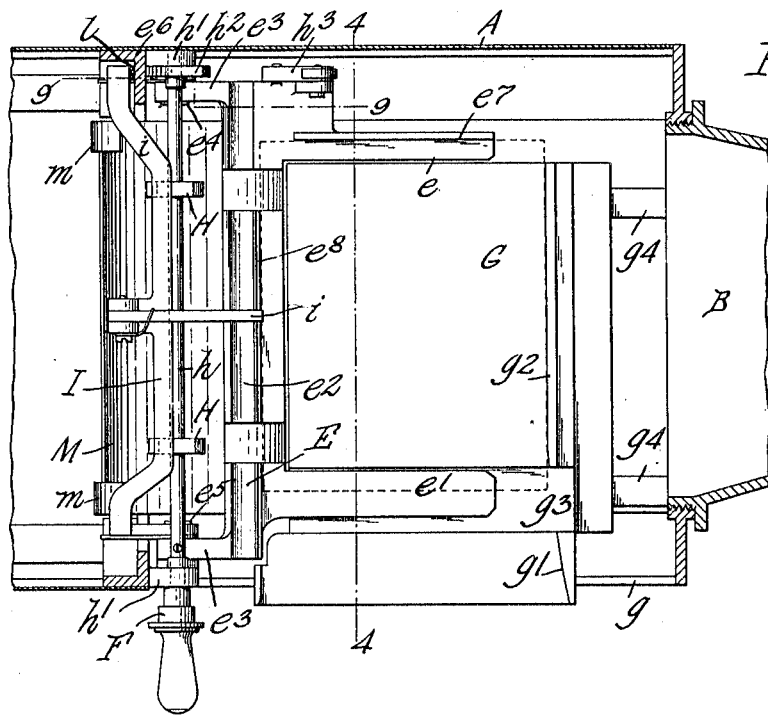
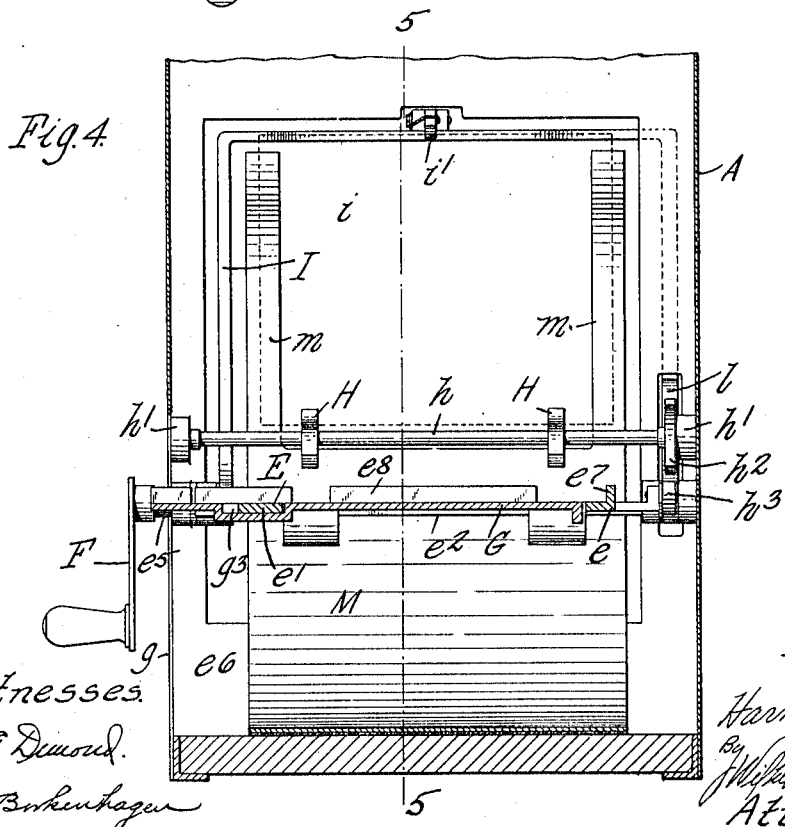
Witnesses.
Inventor.

H. N. OTT.
SLIDE POSITIONING AND CHANGING MECHANISM FOR STEREOPTICONS AND THE LIKE.
APPLICATION FILED MAR. 1, 1912.
1,099,310.
Patented June 9, 1914.
3 SHEETS—SHEET 3.
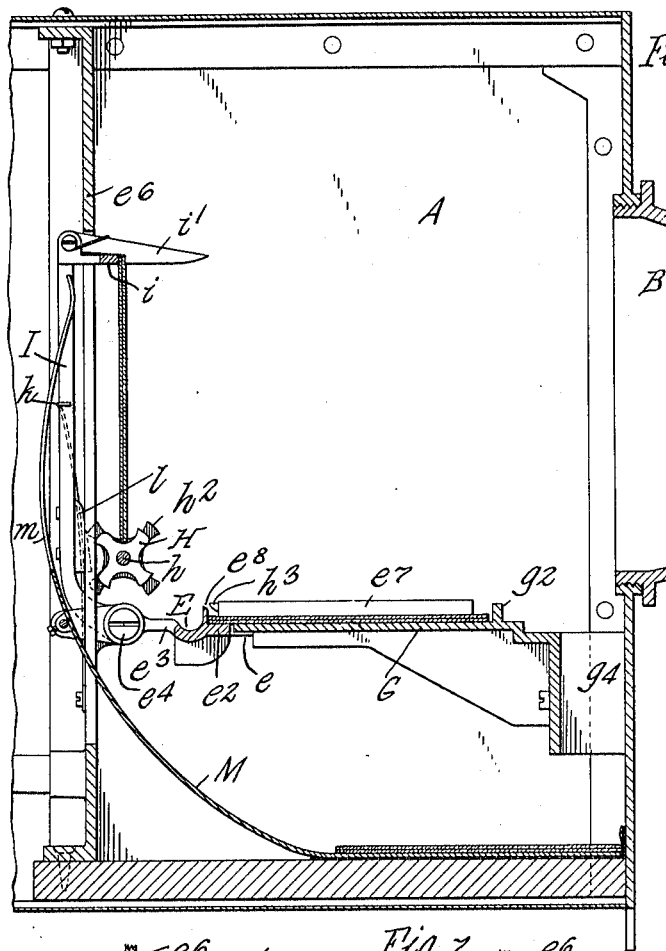
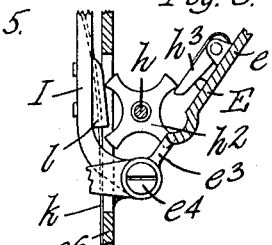
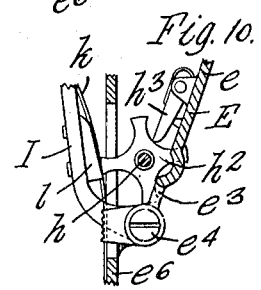
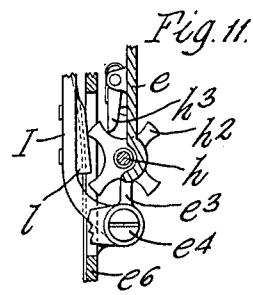
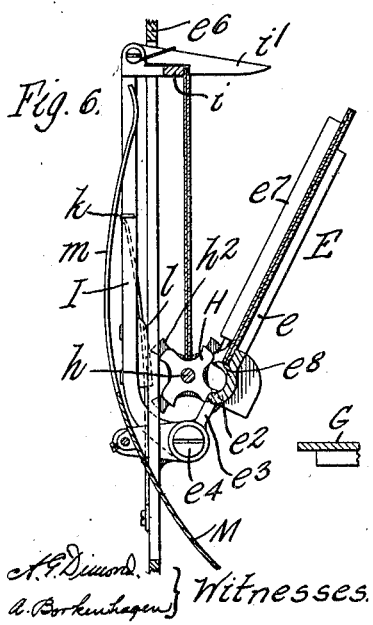
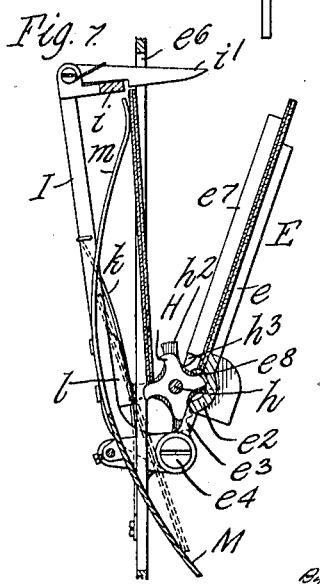
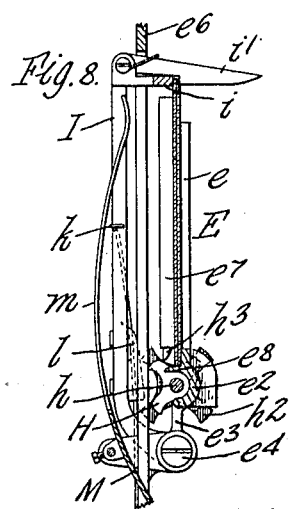
Witnesses.
Inventor.
Harvey N. Ott,
Attorneys.

UNITED STATES PATENT OFFICE.

HARVEY N. OTT, OF BUFFALO, NEW YORK, ASSIGNOR TO SPENCER LENS COMPANY, OF BUFFALO, NEW YORK.

SLIDE POSITIONING AND CHANGING MECHANISM FOR STEREOPTICONS AND THE LIKE.

1,099,310. Specification of Letters Patent. Patented June 9, 1914.

Application filed March 1, 1912. Serial No. 680,895.

*To all whom it may concern:*

Be it known that I, HARVEY N. OTT, a citizen of the United States, residing at Buffalo, in the county of Erie and State of New York, have invented a new and useful Improvement in Slide Positioning and Changing Mechanisms for Stereopticons and the like, of which the following is a specification.

This invention relates to stereopticons or picture projecting instruments, and more particularly to mechanism for use in such instruments for positioning and changing the slides or plates bearing the pictures to be projected.

Stereopticons, as ordinarily made, have a slide carrier arranged to slide transversely of the instrument between the source of light and the projecting lens, the slides being placed in and removed from the carrier at opposite sides of the instrument. Such a construction makes the handling of the slides awkward and troublesome, as the operator has to reach over the instrument in the dark to remove the slides, and not infrequently drops and breaks the slides. In order to produce a dissolving effect in changing the pictures, the stereopticons are made double.

The objects of this invention are to provide a slide or picture positioning or changing mechanism for stereopticons and analogous image projecting instruments, by which the slides or pictures can be more readily and conveniently changed or placed in position in and removed from the instrument; also to provide a slide or picture positioning or changing mechanism by which a dissolving effect can be produced in single stereopticons; and also to produce a slide or picture positioning or changing mechanism which is of simple and inexpensive construction and can be rapidly and conveniently operated.

In the accompanying drawings, consisting of 3 sheets: Figure 1 is a side elevation, partly in section, on a reduced scale of a projecting instrument embodying the invention. Fig. 2 is a fragmentary transverse sectional elevation thereof, in line 2—2, Fig. 1. Fig. 3 is a fragmentary sectional plan thereof. Fig. 4 is a transverse sectional elevation thereof in line 4—4, Fig. 3. Fig. 5 is a longitudinal sectional elevation thereof in line 5—5, Fig. 4. Figs. 6, 7 and 8 are fragmentary sections similar to Fig. 5, showing successive positions of the parts. Figs. 9, 10 and 11 are fragmentary sections in line 9—9, Fig. 3, showing successive positions of the parts.

Like reference characters refer to like parts in the several figures.

The invention is illustrated and described in this application in connection with a stereopticon of the well-known kind in which transparent lantern slides bearing the pictures to be projected are placed between the source of light and the projecting lens, and the invention is especially applicable to these stereopticons. However, the slide or picture positioning or changing mechanism is not necessarily restricted to use in this kind of stereopticon, but is also applicable to other types of picture projecting instruments.

In the use of the term "slide" in this specification in connection with the picture changing or positioning mechanism it is, therefore, not intended to restrict the meaning to a transparent lantern slide when a broader meaning is appropriate.

A represents the case, B the tube of the projecting lens, C the electric lamp or source of light for illuminating the slide, and D the condensing lenses of a single stereopticon. These parts, which form no part of this invention, may be of any usual or suitable construction and arrangement.

The slide changing or positioning mechanism comprises a slide holder or means for supporting the slide in operative relation to the source of light and the projecting lens; and a slide carrier on which the slide is placed and which is moved to place the slide in the holder and to operate the holder to discharge therefrom the slide previously placed in it.

E represents the slide carrier which is pivotally mounted in the case A, so that it normally lies in a position suitable to receive the slide, for instance, horizontally beneath the light cone, and is adapted to be swung to place the slide in operative position in the slide holder. The slide carrier shown consists of a skeleton frame having opposite arms $e\ e'$ extending parallel with the sides of the case A and connected by a cross bar $e^2$ which is provided at opposite ends with legs $e^3$ suitably pivoted in the case A, for example, by pivots $e^4\ e^5$, to the sides of an upright rectangular supporting frame $e^6$. The pivot or journal $e^5$ at one end of the carrier projects out of the case A and is provided outside thereof with a crank or handle F for oscillating the carrier. The slide is adapted to be placed on the carrier with its inner end and bottom edges against raised stop flanges $e^7$ and $e^8$ on the arm $e$ and cross bar $e^2$, respectively, of the carrier, whereby the slide is properly centered with respect to the projecting means when the carrier is swung to place the slide in the slide holder.

In order to facilitate the placing of the slides on the carrier E and enable the operator to do this easily without special care, a stationary table G is preferably provided in the case on which the slides are adapted to be laid and from which they are lifted by the carrier E. Preferably the table projects a short distance out of the case A through the opening $g$ in one side thereof through which the slides are inserted into and removed from the instrument, and is provided with front and rear guide ribs $g'$ $g^2$ arranged to properly guide the slides onto the carrier. In the normal or receiving position of the carrier E its arms $e$ $e'$ lie respectively at the inner edge of the table and in a depression $g^3$ in the table with their upper faces in or slightly below the plane of the surface of the table, so that the slide can be readily laid on the projecting part of the table and shoved inwardly thereon into position over the carrier E without striking the arms $e$ $e'$. The table can be secured in the case in any convenient way, for instance, it is secured to blocks or brackets $g^4$ on the front end of the case.

The slide holder or means for supporting the slide in the focal plane or in operative relation to the projecting means, in the construction shown, comprises a pair of rotatable notched supporting wheels H on which the slide rests at its lower edge, and a holding device adapted to engage the upper edge of the slide for retaining the slide in an upright position on the supporting wheels H. The supporting wheels H are secured to a horizontal shaft $h$ which is journaled in suitable bearings $h'$ on the supporting frame $e^6$ above the pivotal axis of the slide carrier. The shaft $h$ is provided, preferably, at its inner end, with a toothed or ratchet wheel $h^2$ adapted to be rotated by a spring-actuated pawl $h^3$ on the slide carrier E for turning the shaft $h$ and the notched wheels H a portion of a revolution each time the slide carrier is oscillated to place a slide in the slide holder.

The holding device for the top edge of the slide comprises an upright frame or bail I which is pivotally mounted at its lower end and has a horizontal top-bar $i$ on which a spring-actuated catch $i'$ is pivoted for holding the top edge of the slide against said top bar. The frame I shown is of inverted U-shape and is pivoted by forwardly projecting portions at the lower ends of its legs on the pivots $e^4$ $e^5$ for the slide carrier E. The holder frame is held yieldingly in upright holding position by a suitable spring $k$ which permits the frame to be swung rearwardly a short distance and returns the frame when released to the upright position.

In the operation of the slide changing mechanism a slide is placed on the slide carrier and the handle F turned to swing the carrier upwardly. During the upward movement of the carrier the pawl $h^3$ thereon engages the toothed wheel $h^2$ and turns the same, the shaft $h$ and the supporting wheels H a part of a revolution. The lower edge of the slide on the carrier will enter registering notches in the supporting wheels H as the carrier moves upwardly and the slide will rest on the supporting wheels when the carrier reaches the upright position, as shown in Fig. 8. In the rotation of the toothed wheel one of its teeth engages a cam projection $l$ on the adjacent leg of the holder frame I and swings the latter rearwardly, as shown in Fig. 7, and at about the time the carrier reaches the upright position this tooth will pass off of the cam and the frame will be returned by its spring $k$, causing the catch $i'$ to spring over the upper edge of the slide and hold it against the top bar of the frame I, thereby retaining the slide in an upright position on the supporting wheels H when the slide carrier is returned to the normal position. When the carrier is again swung upwardly to place another slide in the holder, the supporting wheels are again turned, as before, and the slide supported thereby will slip off of the wheels at the rear side thereof, as indicated by full and broken lines in Fig. 7, and be dropped from the holder at the same time that the second slide is being moved into the holder in the manner just above described. Thus one slide is discharged from the holder during the last portion of the movement of the slide carrier just before the next slide is placed in position in the holder by the carrier. In this way one slide is brought into the illuminated area and nearly into the focal plane before the previously positioned slide is discharged from the holder, and as the mechanism can be operated very quickly, a very satisfactory dissolving effect of the images on the screen is produced.

M represents a chute or guide plate which is preferably employed for directing the slides that are dislodged from the holder into the bottom of the case beneath the table G. This guide consists of a curved plate extending downwardly and forwardly in the case from the rear side of the slide operating mechanism. The middle portion of the upper end of the guide is removed leaving yielding side extensions *m* against which the upper end of the slide is adapted to fall as it is released from the top holding device. This guide plate breaks the fall of the slides as they drop from the holder and directs them gently to the bottom of the case, thus preventing injury to the slides and reducing the noise. The slides can be readily removed from the bottom of the case through the opening *g* in the side thereof.

By means of the slide operating, positioning or changing mechanism constructed as described, the slides can be very easily and conveniently placed in operative position in and removed from the instrument, and the mechanism can be operated so quickly as to make the change of images practically instantaneous.

I claim as my invention:

1. In a projecting instrument, the combination of means for supporting a slide in operative relation to the projecting means, and a slide carrier on which the slide is adapted to be placed and which is movable toward said supporting means to place the slide in operative position in said supporting means, the direction of movement of said carrier being in a plane perpendicular to the plane in which the operative slide is located, substantially as set forth.

2. In a projecting instrument, the combination of means for supporting a slide in the focal plane, and a slide carrier on which the slide is adapted to be placed and which is movable toward and from the focal plane to place the slide in operative position in said supporting means, substantially as set forth.

3. In a projecting instrument, the combination of means for supporting a slide in operative relation to the projecting means, and a slide carrier on which the slide is adapted to be placed and which is pivoted to swing toward and from said supporting means to place the slide in operative position therein, substantially as set forth.

4. In a projecting instrument, the combination of means for supporting a slide in operative relation to the projecting means, and a slide carrier on which a second slide is adapted to be placed, which is movable toward said supporting means to place said second slide therein, and means operated by said carrier for discharging said first slide from said supporting means, substantially as set forth.

5. In a projecting instrument, the combination of means for supporting a slide in operative relation to the projecting means, including a movable support on which the slide rests, a slide carrier on which a slide is adapted to be placed, and which is movable to place the slide on said movable support, and means operated by the slide carrier to actuate said support to discharge the slide supported thereby, substantially as set forth.

6. In a projecting instrument, the combination of means for supporting a slide in operative relation to the projecting means, comprising a rotatable support on which the slide rests, and a device for holding the slide on said support, a slide carrier on which a slide is adapted to be placed, and which is movable to place the slide on said rotatable support, and means actuated by the carrier for turning said support to discharge the slide supported thereby, substantially as set forth.

7. In a projecting instrument, the combination of means for supporting a slide in operative relation to the projecting means, comprising rotatable notched wheels on which the slide rests, and a catch which engages the slide to hold it on said wheels, a movable slide carrier on which a slide is adapted to be placed and which is movable to place the slide on said notched wheels, and means actuated by said carrier for turning said notched wheels to discharge the slide supported thereby, substantially as set forth.

8. In a projecting instrument, the combination of means for supporting a slide in operative relation to the projecting means, a slide carrier which is movable toward said supporting means to place a slide in operative position therein, and a table on which the slide is adapted to be laid and from which it is carried by said carrier to said supporting means, substantially as set forth.

9. In a projecting instrument, the combination of means for supporting a slide in operative relation to the projecting means, a table on which the slide is adapted to be laid, and a slide carrier which normally occupies a position beneath the slide on the table and is movable past said table to lift the slide off of the table and place it in operative position in said supporting means, substantially as set forth.

10. In a projecting instrument, the combination of means for supporting a slide in operative relation to the projecting means, a slide carrier on which the slide is adapted to be placed and which is movable toward said supporting means to place the slide in said supporting means, said slide carrier having parts adapted to actuate said supporting means to discharge from the supporting means the slide held thereby, and a chute for receiving the slide from said supporting means, substantially as set forth.

11. In a projecting instrument, the combination of a case provided with an opening in one side thereof, means for supporting a slide in operative relation to the projecting means, means on which a slide is adapted to be placed through said opening in the case, and which is movable toward said supporting means to place the slide in said supporting means, means actuated by the movable means to discharge from the supporting means the slide held thereby, and means for directing the discharged slide into a portion of said case from which it can be removed through said opening, substantially as set forth.

12. In a projecting instrument, the combination of a case provided with an opening in one side thereof, mechanism on which the slides are adapted to be placed through said opening in the case, and which is movable to place a slide in operative relation to the projecting means, and means actuated by said mechanism to discharge a previously positioned slide into said case beneath said mechanism in position to be removed through said opening in the case, substantially as set forth.

Witness my hand this 29th day of February, 1912.

HARVEY N. OTT.

Witnesses:
 LOUIS M. POTTER,
 JOHN O. KRAEBEL.

Copies of this patent may be obtained for five cents each, by addressing the "Commissioner of Patents, Washington, D. C."